United States Patent
Hu et al.

(10) Patent No.: US 9,948,104 B2
(45) Date of Patent: Apr. 17, 2018

(54) TRIPOLAR VSC-HVDC TRANSMISSION SYSTEM AND METHOD

(71) Applicants: NR ELECTRIC CO., LTD., Nanjing, Jiangsu (CN); NR ELECTRIC ENGINEERING CO., LTD., Nanjing, Jiangsu (CN)

(72) Inventors: Ming Hu, Jiangsu (CN); Zhenxia Shao, Jiangsu (CN); Xinyan Jiao, Jiangsu (CN); Jie Tian, Jiangsu (CN); Yu Lu, Jiangsu (CN); Gang Shen, Jiangsu (CN)

(73) Assignees: NR Electric Co., Ltd., Nanjing, Jiangsu (CN); NR Electric Engineering Co., Ltd., Nanjing, Jiangsu (CN)

(*) Notice: Subject to any disclaimer, the term of this patent is extended or adjusted under 35 U.S.C. 154(b) by 0 days.

(21) Appl. No.: 15/111,216

(22) PCT Filed: Jan. 22, 2015

(86) PCT No.: PCT/CN2015/071282
§ 371 (c)(1),
(2) Date: Jul. 13, 2016

(87) PCT Pub. No.: WO2015/176549
PCT Pub. Date: Nov. 26, 2015

(65) Prior Publication Data
US 2016/0336751 A1  Nov. 17, 2016

(30) Foreign Application Priority Data
May 22, 2014 (CN) .......................... 2014 1 0220437

(51) Int. Cl.
*H02J 1/08* (2006.01)
*H02J 3/36* (2006.01)
*H02M 5/458* (2006.01)

(52) U.S. Cl.
CPC .................. *H02J 3/36* (2013.01); *H02J 1/08* (2013.01); *H02M 5/4585* (2013.01); *Y02E 60/60* (2013.01)

(58) Field of Classification Search
CPC ...... H02J 1/08; H02J 3/36; H02M 2007/4835; H02M 5/4585
See application file for complete search history.

(56) References Cited

U.S. PATENT DOCUMENTS

| 6,714,427 | B1 | 3/2004 | Barthold | |
|---|---|---|---|---|
| 2004/0090213 | A1* | 5/2004 | Barthold | H02J 3/36 323/207 |

(Continued)

FOREIGN PATENT DOCUMENTS

| CN | 103311947 | 9/2013 |
|---|---|---|
| CN | 103595064 | 2/2014 |
| CN | 203839975 | 9/2014 |

OTHER PUBLICATIONS

English Translation of CN 103595064, Patent Translate, 11 pages.*
International Search Report filed in PCT/CN2015/071282 dated Apr. 24, 2015, 4 pages.

*Primary Examiner* — Harry Behm
(74) *Attorney, Agent, or Firm* — Rankin, Hill & Clark LLP (57) ABSTRACT

A tripolar VSC-HVDC system and method include a rectifier and an inverter formed by a three-phase six-bridge arms modular multilevel converter (MMC) respectively, and two converter valves are arranged on the DC side of the rectifier and inverter respectively. The midpoint of upper and lower converter valves of the rectifier and inverter are connected with a pole 3 DC line by a smoothing reactor. Triggering of the upper and lower converter valves is controlled to change (Continued)

the DC voltage polarity of the pole 3 periodically, and tripolar DC transmission is realized by modulating current orders of the three poles.

4 Claims, 6 Drawing Sheets

(56) References Cited

U.S. PATENT DOCUMENTS

| | | | |
|---|---|---|---|
| 2010/0232190 A1* | 9/2010 | Asplund | H02J 3/36 363/35 |
| 2014/0226373 A1* | 8/2014 | Park | H02M 1/12 363/35 |
| 2015/0229234 A1* | 8/2015 | Park | H02M 1/12 363/78 |

* cited by examiner

TRIPOLAR VSC-HVDC TRANSMISSION SYSTEM AND METHOD

BACKGROUND

Technical Field

The present invention relates to the technical field of power transmission and distribution, in particular to a tripolar High Voltage Direct Current (HVDC) transmission system for converting an existing AC transmission line to a DC transmission line.

Related Art

Along with rapid development of economy in China, a power requirement conflict is urgent day by day. On one aspect, increase of a power load exceeds a transmission capacity of an original AC transmission line, and a new power corridor transmission is hard to get due to limitation of a land resource; on the other aspect, traditional AC transmission is limited by insulation and AC power grid characteristics, a line transmission power hardly achieves the maximum thermal power that the conductor can bear, and therefore, a new technique is urgently required to develop the power transmission potential of the existing lines.

In order to make full use of the existing AC line transmission corridor, besides the direct increase of the line operating voltage level, following techniques can be adopted to improve the line transmission capacity: a fixed series parallel compensation technique, a flexible AC transmission technique, a compact power transmission technique, a line dynamic capacity increasing technique, a technique of improving a working allowable temperature of a conductor, a novel conductor power transmission technique and a technique of converting an AC line into a DC line.

Transmission power of an AC line is mostly limited by characteristics of an AC power grid, and it is usually far lower than the thermal maximum of the conductors. Compared with AC transmission, a DC transmission line current can achieve the thermal maximum of the conductor, and the DC line is lower in construction cost and small in loss. When the saved cost of the DC line is enough to offset the increased cost of building a new converter station, the economic benefits of DC transmission are more obvious. In addition, the DC transmission has the advantages of power control, no increase of a system short circuit current, without skin effect of the line, higher insulation utilization rate of the line or cables, fast regulating speed, reliable operation and capability of realizing asynchronous connecting of AC systems.

Figure 1:
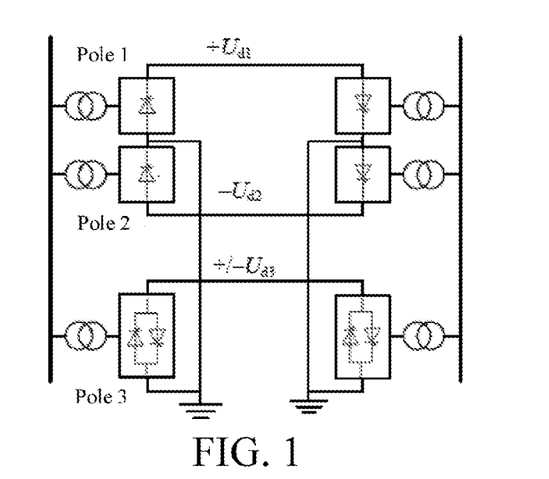
FIG. 1 is a schematic structural diagram of a tripolar DC transmission system based on LCC-HVDC.

In 2004, American scholar Barthold L O provides a tripolar DC transmission system based on a conventional LCC-HVDC as shown in FIG. 1 in U.S. Pat. No. 6,714,427B1, a principle thereof is to adopt a current modulation technique to convert an AC transmission line into a DC transmission line. Compared with a bipolar and a monopolar DC transmission conversion solution, a tripolar DC transmission solution can use all original AC three-phase lines, and has advantages on aspects of improving power transmission capacity, economic cost and reliability. At present, conversion of AC lines to DC lines by the tripolar DC transmission technique is still in principle research stage and no project instances exist. The LCC-HVDC system adopts a semicontrolled thyristor, the tripolar DC transmission solution in FIG. 1 has following defects: (1) if an inverter AC system has a ground fault, it is possible that three DC poles are failed in commutation at the same time, resulting the DC transmission power is interrupted, And the security and stability of the receiving end system is threatened. (2) during the operation of the tripolar DC system, the current value of each pole, the voltage polarity and current direction of the pole 3 are required to be fast changed according to certain period, which certainly will generate disturbance to the AC system at two ends. (3) since each line is configured with a complete pole, more converter transformers, AC filters, reactive compensation devices, converters and corresponding auxiliary devices are required, which resulting in a higher reconstruction investment, and higher occupied space of the new converter station, and it is especially unfavorable for implementation of a project of converting AC lines to DC lines in large cities with strict limit on the occupied space of the converter station.

In recent years, the VSC-HVDC technique, which adopts the full controlled power electronic device IGBT, is developing rapidly. Compared with the traditional LCC-HVDC transmission technique, the VSC-HVDC technique has the advantages of no need of commutation voltage, support by power grid, capability of providing power to a passive network, no commutation failure, capability of realizing independent control of active power and reactive power and no need of AC filter and reactive compensation devices. Differentiated from a structure of a converter, the VSC-HVDC system mainly comprises two level converters, a tri-level converter and a modular multilevel converter (MMC) structure, wherein the MMC-based VSC-HVDC system not only has the VSC-HVDC general advantages, but also has the characteristics of low switching frequency, small loss, easy expansion, high quality of output waveforms, low manufacturing difficulty etc, Therefore, MMC-based VSC-HVDC has broad application prospects.

In order to solve the problems of the conventional LCC-HVDC based tripolar DC system, reduce the area of the new converter station and improve the economy of the solution of converting AC lines to DC lines, the present patent provides a tripolar VSC-HVDC system based on modular multilevel converter (MMC), which can well meet the requirements of improving transmission capacity in the urban power supply system using the solution of conversion AC lines to DC lines.

SUMMARY

Objectives of the present invention are to provide a tripolar VSC-HVDC system and method, solve the defects of the tripolar LCC-HVDC system, and meet the requirements of converting AC lines to DC lines in urban power supply systems lacking of land resource.

The present invention provides a tripolar VSC-HVDC system, adopting three conductors to transmit DC power, wherein a rectifier and an inverter consist of a three phase six-bridge arm modular multilevel converter (MMC) respectively, midpoints of 1, 2, 3 phase units of the rectifier and inverter are connected with a secondary side of a converter transformer, and two converter valves composed of fully controlled devices are arranged between poles 1 and 2 on the DC side of the rectifier and inverter respectively, positive poles of the rectifier and inverter are connected with a pole 1 DC line by a smoothing reactor, negative poles of the rectifier and inverter are connected with a pole 2 DC line by a smoothing reactor, and connecting points of the upper and lower converter valves of the rectifier and inverter are connected with a pole 3 DC line by a smoothing reactor.

Further, the rectifier and inverter consist of three phase six-bridge arms, each of which is formed by serially connecting at least one submodule and one bridge arm reactor, and upper and lower bridge arms in each phase form a phase unit together.

Further, the basic submodules of the converters adopt a modular multilevel structure, and basic units of different quantities are connected in series or parallel to adapt the requirements of different voltage and current levels.

Further, if the three conductors adopted by the power transmission system are cables, then the submodules of the MMC are of half-bridge structures. If the adopted three conductors are overhead lines, then the submodules of the MMC consist of two clamp double submodules.

The present invention provides a tripolar VSC-HVDC control method related to the system, DC current directions of the poles 1 and 2 are constant, and current orders of the poles 1 and 2 are periodically modulated between a maximum and a minimum, a ratio of the maximum to the minimum of the current fixed value is 2, the pole 3 current is a difference value between the pole 1 and pole 2, the pole 3 current order is the minimum of the poles 1 and 2, and a current direction is periodically changed. DC voltages polarity of the poles 1 and 2 are constant, the conducting of the upper and lower converter valves at the dc sides of the rectifier and the inverter is controlled to cause a pole 3 line to operate in parallel with a pole 1 line or a pole 2 line periodically, thereby changing the DC voltage polarity of the pole 3 periodically and ensuring DC power direction of the pole 3 keep constant.

Further, when the voltage polarity of the pole 1 is positive, the pole 1 current is a current fixed value maximum, the voltage polarity of the pole 2 is negative, and the pole 2 current is a current fixed value minimum, the two valves between the poles 3 and 2 on the DC side of the rectifier and the inverter are switched on, and the two valves between the pole 3 and pole 1 are turned off, so the pole 3 line and the pole 2 line operate in parallel, the pole 3 line has negative voltage, pole 3 current order is a current rated value minimum, and the current direction is the same as that of the pole 2, when the pole 1 current order is switched to the current fixed value minimum from the current fixed value maximum, and the pole 2 current order is switched to the current fixed value maximum from the current fixed value minimum, the two valves between the poles 3 and 1 DC side of the rectifier and the inverter are switched on, and the two valves between the poles 3 and 2 are switched off, so the pole 3 line order is a current fixed value minimum and the current direction is the same as that of the pole 1.

The present invention meets the requirements of converting the AC line to the DC line, the advantageous features of the invention not only includes the characteristics of no commutation failure, capability of stabilizing voltage of the AC system at two sides, and no need of AC filter and reactive compensation devices, but also as following: the four valves are added based on a conventional bipolar MMC-HVDC three phase six-bridge arm structure, power transmission by three conductors is realized, a conversion coefficient is not changed compared with the conventional bipolar MMC-HVDC, and only four valves are increased. In addition, for the conventional bipolar MMC-HVDC system, once one line has a fault, bipolar systems need to be stopped, while for the solution provided by the present invention, since three lines are adopted for power transmission, after one line has a fault, the last two lines can form the conventional bipolar MMC-HVDC system for operation, thereby greatly improving the reliability of the whole system. In conclusion, the solution of the present invention has the characteristics of small occupied space of the converter station, low total conversion cost and high reliability, the three lines are fully used for power transmission, and the system is particularly suitable for the implementation of a capacity increasing project of conversion from the AC line to the DC line in urban power supply systems lack of land resource and has well project application value.

DETAILED DESCRIPTION

The technical solution of the present invention is described in detail in combination with the drawings and specific embodiments.

Figure 2:
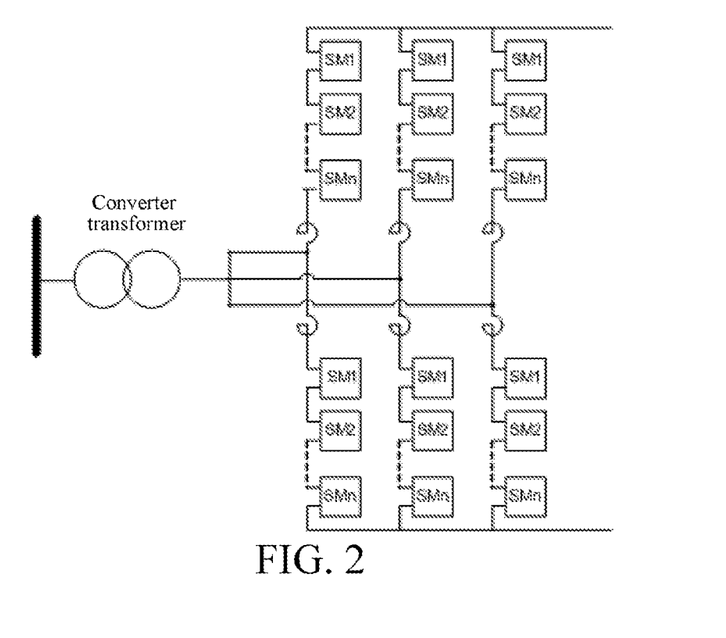
FIG. 2 is a structural schematic diagram of a typical three phase six-bridge arm MMC system.
Figure 3:
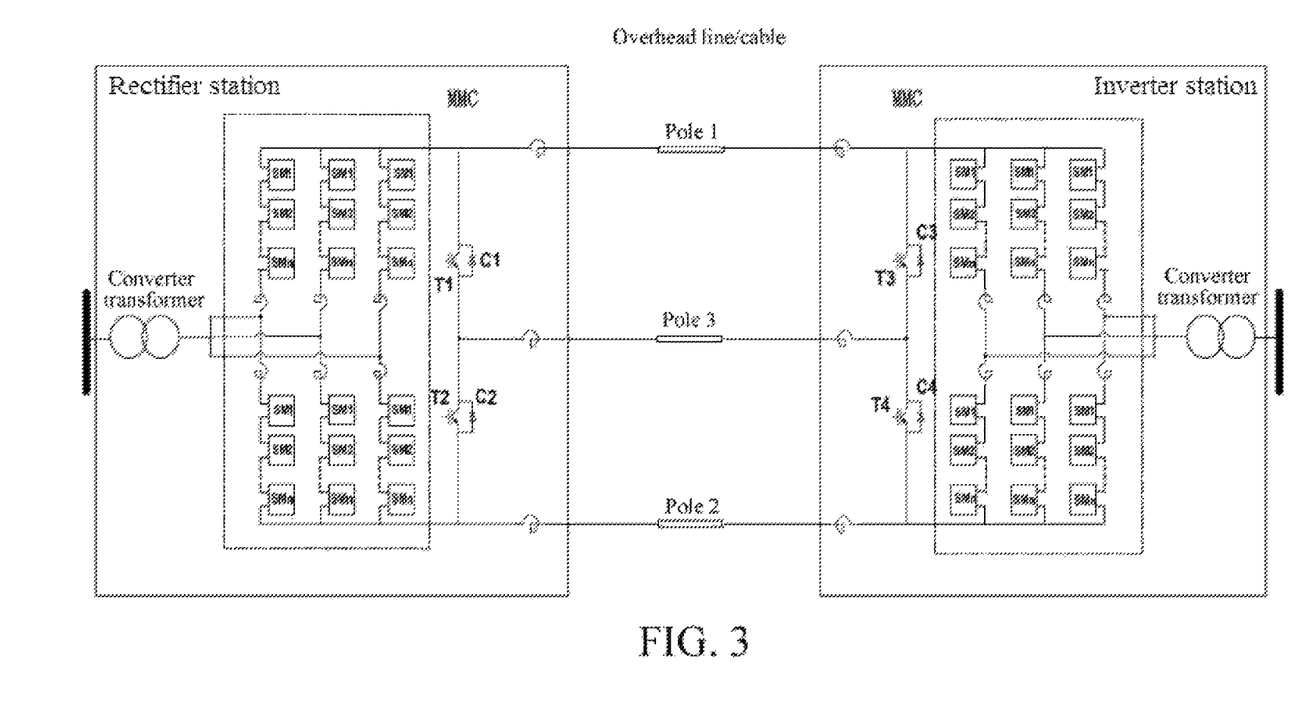
FIG. 3 is a topologic structural schematic diagram of a tripolar VSC-HVDC system based on MMC.

FIG. 2 is a structural schematic diagram of a typical three phase six-bridge arms modular multilevel converter (MMC) adopted in a bipolar DC system. Based on the bipolar DC system, two converter valves are arranged on the DC side of the rectifier and inverter respectively, the midpoint of upper and lower converter valves of the rectifier and inverter are connected with a pole 3 DC line by a smoothing reactor, triggering of the valves is controlled to change the DC voltage polarity of the pole 3 periodically, and the tripolar DC power transmission is realized by modulating the current orders of the three poles. The tripolar DC power transmission is realized by a following specific solution:

As shown in FIG. 3, a rectifier and an inverter consist of a three phase six-bridge arm MMC respectively, midpoints of 1, 2, 3 phase units of the rectifier and inverter are connected with a secondary side of a converter transformer, two converter valves are arranged on the DC side of the DC system converter, and the valves in the drawing consist of IGBT and freewheel diodes reversely connected in parallel. Positive poles of the rectifier and inverter are connected with a pole 1 DC line by a smoothing reactor, negative poles of the rectifier and inverter are connected with a pole 2 DC line by a smoothing reactor, and midpoints of the upper and lower valves of the rectifier and inverter are connected with a pole 3 DC line by a smoothing reactor.

DC voltage polarity and current direction of the poles 1 and 2 are constant without change, the current orders of the poles 1 and 2 are periodically modulated between a maximum and a minimum, the voltage polarity and the current direction of the pole 3 are changed periodically, the pole 3 current is a difference between the pole 1 and pole 2, triggering of the upper and lower converter valves on the DC side of the rectifier and the inverter is controlled to realize the fast change of the DC voltage polarity of the pole 3 periodically, and ensure the direction of the pole 3 DC power unchanged.

Further, the rectifier and inverter consist of three phase six-bridge arms modular multilevel converter, each of which is formed by serially connecting at least one submodule and one bridge arm reactor, different number of submodules are connected in series in order to meet the needs of different voltage levels and current, and upper and lower bridge arms in each phase are combined together to form a phase unit.

A rectifier transformer is used for performing the level conversion of three-phases AC voltage provided by a sending end AC system;

a rectifier is used for converting the three-phase AC to DC; a smoothing reactor is used for smoothing ripples in the DC current; an inverter is used for converting the smoothed DC into three-phase AC; an inverter transformer is used for performing voltage level conversion on the three-phase AC converted by the MMC, and to transmit to a receiving end AC system.

Figure 4:
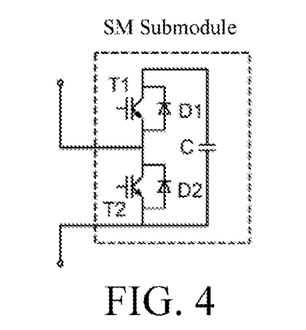
FIG. 4 is a submodule structural diagram of an MMC suitable for a cable.
Figure 5:
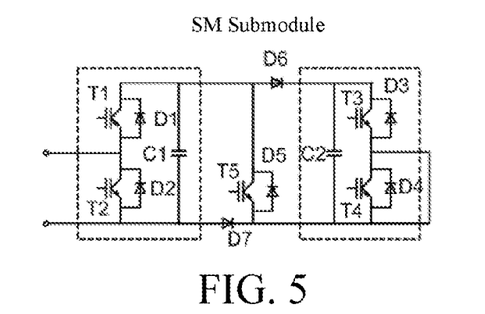
FIG. 5 is a submodule structural diagram of an MMC suitable for an overhead line.

Further, the three conductors adopted by the power transmission system can be cables or overhead lines. If the three conductors are cables, due to the low probability of cable failure and it is usually a permanent fault, the fault can be removed by tripping an AC side breaker without affecting the availability of the whole system. Therefore the submodules of the MMC can adopt a half-bridge structure, as specifically shown in FIG. 4; if the three conductors are overhead lines, because of the high probability of temporary fault of overhead line, if the fault is removed by tripping the AC side breaker, the time is longer, and the availability of the whole system is affected. Therefore, the fault of the DC side is required to be removed by controlling the converters. For the purpose, the submodules of the MMC adopt a clamp double submodules structure as specifically shown in FIG. 5. The MMC adopting the half-bridge structure and the clamp double submodule structure is in the prior art and is not repeated.

In the tripolar DC transmission system, DC currents of the three poles are modulated to realize tripolar DC transmission. DC voltage polarity and DC current direction of the poles 1 and 2 are constant without change, the current orders of the poles 1 and 2 are periodically modulated between a maximum and a minimum, the DC voltage polarity and DC current direction of the pole 3 is periodically changed, and the pole 3 current order is a difference of the poles 1 and 2 current orders.

In the tripolar DC transmission system, a ratio of the maximum to the minimum of the current order of the poles 1 and 2 is 2, the pole 3 current order is the minimum of the current orders of the poles 1 and 2, and the current direction of pole 3 is periodically changed. Triggering of the upper and lower converter valves on the DC side of the rectifier and the inverter is controlled to cause a pole 3 line to operate in parallel with a pole 1 line or a pole 2 line periodically, thereby change the DC voltage polarity of the pole 3 periodically and ensure the DC power direction of the pole 3 unchanged.

Figure 6:
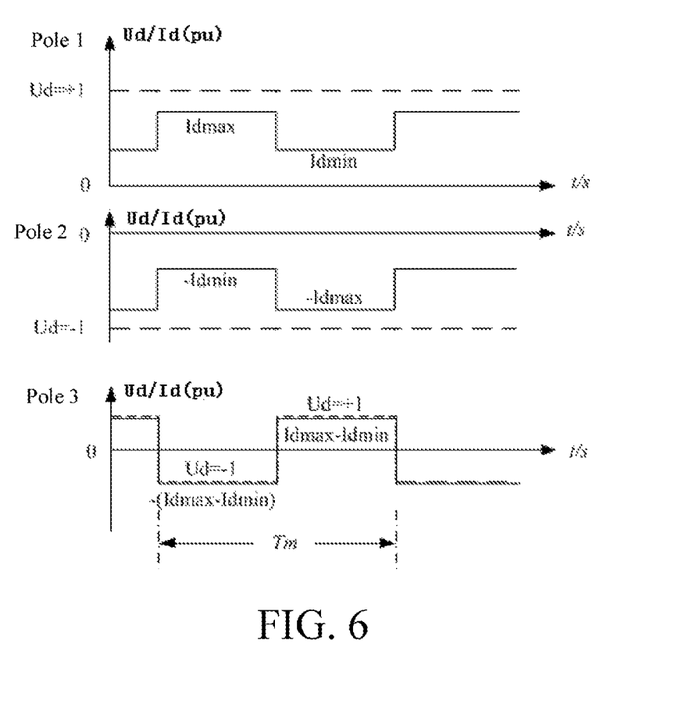
FIG. 6 is a principle diagram of the current modulation in the tripolar VSC-HVDC transmission system.

A modulation control strategy of tripolar DC is as shown in FIG. 6: the DC voltage polarity and current direction of the poles 1 and 2 are constant without change, and the poles 1 and 2 alternatively periodically transmit large current and small current, the pole 3 flows by the unbalanced current of the poles 1 and 2, cause the current flowing through a grounding electrode to be minimal. The voltage polarity and current direction of pole 3 can be changed rapidly and ensure power transmission direction unchanged. During normal operation of the tripolar DC system, current orders of respective poles are modulated. The current orders of the poles 1 and 2 are constantly switched between the maximum Idmax and the minimum Idmin, and the current order of the pole 3 takes the difference value between the current orders of the poles 1 and 2. The voltage polarity of the poles 1 and 2 are kept unchanged. Due to the periodical change of the current direction of the pole 3, the voltage of the pole 3 along with the current direction of the pole 3 is periodically inversed to ensure an unchanged power transmission direction of the pole 3. A modulation period $T_m$ of the Idmax and Idmin is 4-5 min and a specific value can be optimized.

Figure 7:
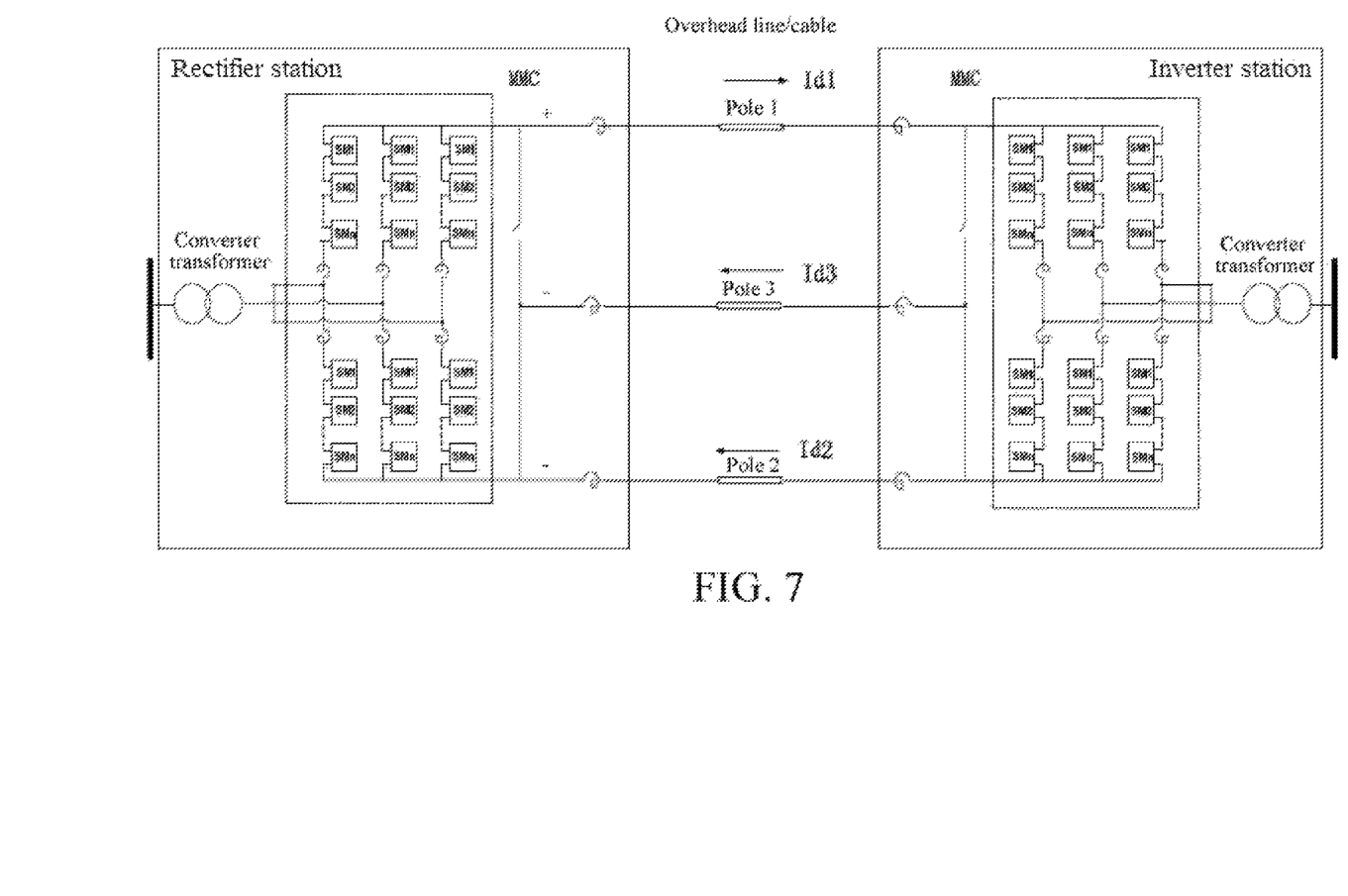
FIG. 7 is a system structural schematic diagram when voltage of a pole 3 of a tripolar VSC-HVDC transmission system is negative.
Figure 8:
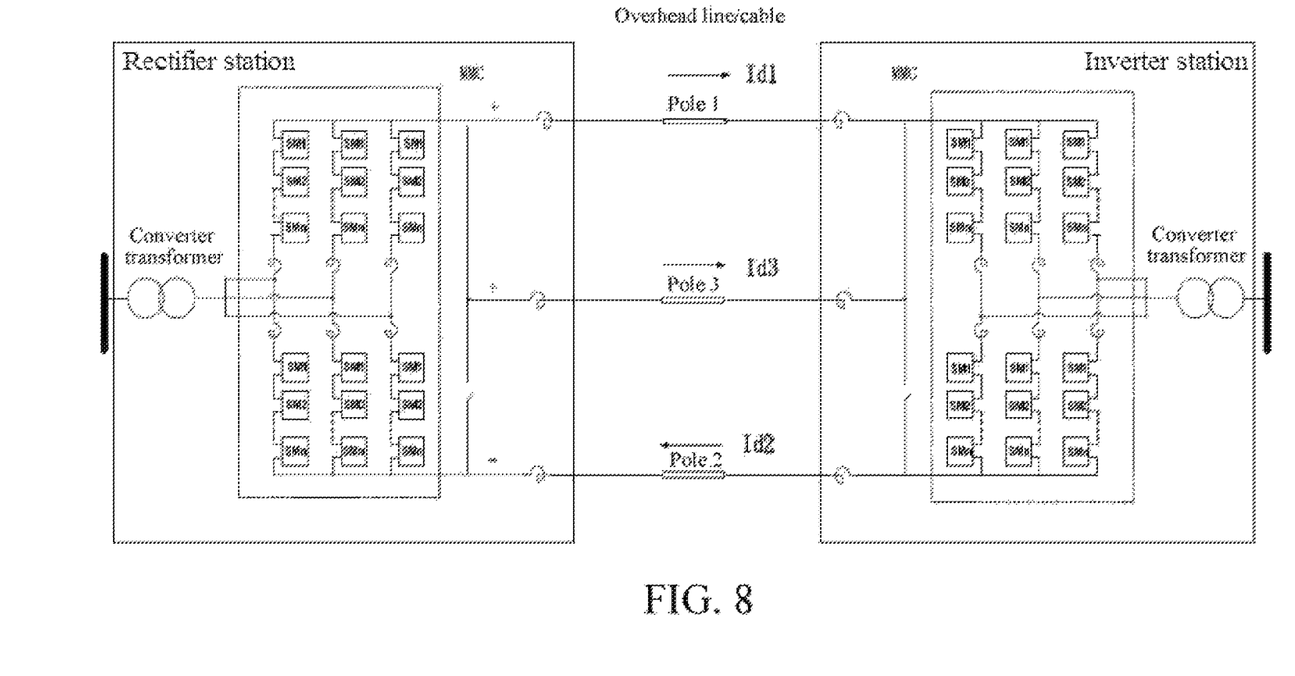
FIG. 8 is a system structural schematic diagram when voltage of a pole 3 of a tripolar VSC-HVDC transmission system is positive.

A specific current modulation process can be as follows: the voltage of the pole 1 line in FIG. 3 is positive, the pole 1 current is Idmax, the pole 2 voltage is negative, the pole 2 current is Idmin, IGBT T2 and T4 on the DC side of the rectifier and the inverter are switched on, T1 and T3 are switched off, the pole 3 line and the pole 2 line operate in parallel, the voltage of the pole 3 line is negative, the pole 3 current is Idmin, the current direction is same as that of the pole 2, and at this point, a specific topology of the tripolar DC system is as shown in FIG. 7; when the pole 1 current 1 is switched to Idmax from Idmin, the direct side IGBT T1 and T3 of the rectifier and the inverter are switched on, T2 and T4 are switched off, at this point, the pole 3 line and the pole 1 line operate in parallel, the voltage of the pole 3 line is positive, the pole 3 current is Idmin, the current direction is same as that of the pole 1, and a specific topology of the tripolar DC system is as shown in FIG. 8.

In FIG. 6, Idmax is equal to 2Idmin, then the Idmax and Idmin are respectively 1.26 pu and 0.63 pu, the pole 3 current is 0.63 pu, at this point, the tripolar DC transmission power is 2.53 pu and is 1.26 times of the transmission power of a bipolar system consisting of a conventional MMC.

For the bipolar HVDC system based on the MMC in FIG. 2, once one line has a fault, the all bipolar system is required to be blocked. In the solution provided by the present invention, based on the conventional bipolar MMC-HVDC system, two converter valves are arranged on the DC side of the converter, three lines are utilized, and the tripolar DC system can be realized by modulation on current orders of three poles and the transmission capacity is improved by 26% compared with the bipolar DC system. Once one line has a fault, considering that each pole system has an overloading capacity of 15%, the residual bipolar system can still transmit 2.3 pu DC power, which is equivalent to the 91% of the power before the fault, therefore the whole system has higher reliability.

The above embodiments are merely intended to describe the technical thought of the present invention rather than limiting a protection scope of the present invention, and any modification made based on the technical solution according to the technical thought of the present invention fall within the protection scope of the present invention.

What is claimed is:

1. A tripolar VSC-HVDC control method for controlling a tripolar VSC-HVDC system adopting three conductors to transmit DC power, the system comprising:
a rectifier and an inverter formed by a three phase six-bridge arms modular multilevel converter (MMC) respectively, midpoints of 1, 2, 3 phase units of the rectifier and inverter are connected with a secondary side of a converter transformer, and
two converter valves of fully controlled semiconductor devices are arranged between poles 1 and 2 on the DC side of the rectifier and inverter respectively, positive poles of the rectifier and inverter are connected with a pole 1 DC line by a smoothing reactor, negative poles of the rectifier and inverter are connected with a pole 2 DC line by a smoothing reactor, and connecting points of the upper and lower converter valves of the rectifier and inverter are connected with a pole 3 DC line by a smoothing reactor, the method comprising:

controlling current directions of the poles 1 and 2 to be constant without change;

periodically modulating a current fixed value between a maximum and a minimum, wherein a ratio of the maximum to the minimum of the current fixed value is 2, the pole 3 current is a difference value between the pole 1 and pole 2, and the fixed value of the direct current of the pole 3 is the minimum of the fixed values of the direct current of the poles 1 and 2;

periodically changing a current direction of the pole 3, wherein DC voltage polarity of the poles 1 and 2 is constant without change;

controlling triggering of the upper and lower converter valves of the rectifier and the inverter to cause a pole 3 line to operate in parallel with a pole 1 line or a pole 2 line periodically, thereby changing the DC voltage polarity of the pole 3 periodically and ensuring unchanged DC power direction of the pole 3.

2. The tripolar VSC-HVDC control method according to claim 1, wherein the rectifier and inverter include three phase six-bridge arms, each of which is formed by serially connecting at least one submodule and one bridge arm reactor, and upper and lower bridge arms in each phase form a phase unit together.

3. The tripolar VSC-HVDC control method according to claim 1, wherein submodules of the MMC are of half-bridge structures if the three conductors adopted by the system are cables, and the submodules of the MMC consist of two clamp double submodules if the adopted three conductors are an overhead line.

4. The tripolar VSC-HVDC control method according to claim 1, wherein the two converter valves on the DC side of the rectifier or inverter between the poles 3 and 2 are switched on, and the two converter valves between the pole 3 and pole 1 are turned off when the voltage of the pole 1 line is positive, the pole 1 current is a current fixed value maximum, the voltage of the pole 2 line is negative, and the pole 2 current is a current fixed value minimum, so that the pole 3 line and the pole 2 line operate in parallel, the pole 3 line has negative voltage, the pole 3 current order is a current rated value minimum, and the pole 3 current direction is the same as that of the pole 2, and that the two valves on the DC side of the rectifier or inverter between the poles 3 and 1 of are switched on, the two valves between the poles 3 and 2 are switched off when the pole 1 is switched to the current fixed value minimum from the current fixed value maximum, and the pole 2 is switched to the current fixed value maximum from the current fixed value minimum, so that, the pole 3 line and pole 1 line operate in parallel, the pole 3 line has positive voltage, the pole 3 current order is a current fixed value minimum and the pole 3 current direction is the same as that of the pole 1.

\* \* \* \* \*